United States Patent
Oba et al.

(10) Patent No.: US 12,466,074 B2
(45) Date of Patent: Nov. 11, 2025

(54) IMAGE PROCESSING METHOD, IMAGE PROCESSING APPARATUS, ROBOT-MOUNTED TRANSFER DEVICE, AND SYSTEM

(71) Applicants: DMG MORI CO., LTD., Nara (JP); Movensys Corporation, Somerville, MA (US)

(72) Inventors: Yuta Oba, Nara (JP); Tsutomu Sakurai, Hokkaido (JP); Hideki Nagasue, Nara (JP); Masaaki Nakagawa, Nara (JP); Hideaki Tanaka, Nara (JP); Kota Weaver, Lexington, MA (US); Anand Parwal, Lexington, MA (US)

(73) Assignees: DMG MORI CO., LTD., Nara (JP); Movensys Corporation

( * ) Notice: Subject to any disclaimer, the term of this patent is extended or adjusted under 35 U.S.C. 154(b) by 296 days.

(21) Appl. No.: 17/085,285

(22) Filed: Oct. 30, 2020

(65) Prior Publication Data

US 2022/0134577 A1    May 5, 2022

(51) Int. Cl.
*B25J 9/00* (2006.01)
*B25J 9/16* (2006.01)

(52) U.S. Cl.
CPC .................... *B25J 9/1697* (2013.01)

(58) Field of Classification Search
CPC ......... B25J 9/1697; G05B 2219/37067; G05B 2219/40613
See application file for complete search history.

(56) References Cited

U.S. PATENT DOCUMENTS

| | | | |
|---|---|---|---|
| 6,681,151 B1* | 1/2004 | Weinzimmer | B25J 9/1697 356/243.1 |
| 2013/0073089 A1* | 3/2013 | Nakahara | B25J 19/023 901/41 |
| 2016/0151915 A1 | 6/2016 | Nishi et al. | |
| 2016/0349741 A1* | 12/2016 | Takahashi | G05B 19/41865 |
| 2017/0017226 A1* | 1/2017 | Yamazaki | B23Q 17/2471 |
| 2018/0093380 A1* | 4/2018 | Yoshida | B25J 13/088 |
| 2018/0161978 A1 | 6/2018 | Naitou | |
| 2018/0264648 A1* | 9/2018 | Kim | B25J 19/02 |
| 2019/0160681 A1 | 5/2019 | Suyama | |
| 2019/0160682 A1* | 5/2019 | Sato | B25J 9/162 |
| 2020/0125872 A1* | 4/2020 | Jensen | G06K 19/06037 |
| 2020/0306982 A1 | 10/2020 | Itou | |
| 2022/0371209 A1* | 11/2022 | Baba | B23Q 7/04 |

FOREIGN PATENT DOCUMENTS

| | | |
|---|---|---|
| JP | 2016221622 A | 12/2016 |
| JP | 2017132002 A | 8/2017 |

OTHER PUBLICATIONS

Extended European Search Report related to Application No. EP21885886.8 reported on May 14, 2024.

* cited by examiner

*Primary Examiner* — Khoi H Tran
*Assistant Examiner* — Tien Minh Le
(74) *Attorney, Agent, or Firm* — von Briesen & Roper, s.c.

(57) ABSTRACT

A system includes a machine tool 10, a robot 25 having a camera 31, and a transportation device 35 having the robot 25 mounted thereon, and an identification figure is arranged in a machining area of the machine tool 10.

5 Claims, 12 Drawing Sheets

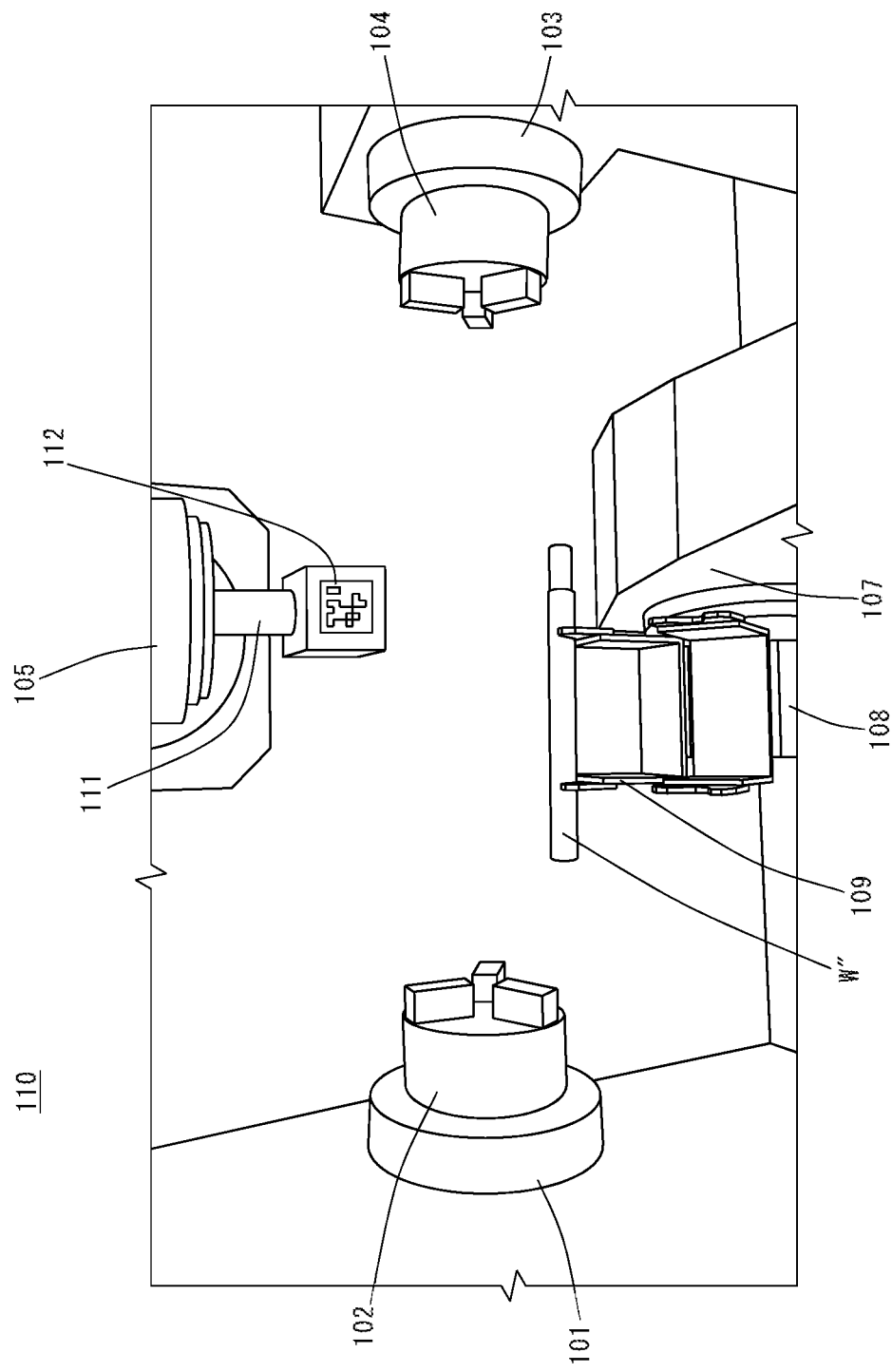

IMAGE PROCESSING METHOD, IMAGE PROCESSING APPARATUS, ROBOT-MOUNTED TRANSFER DEVICE, AND SYSTEM

BACKGROUND OF THE INVENTION

1. Field of the Invention

The present disclosure relates to a machine tool which machines a workpiece, and a robot-mounted transportation device which includes a robot performing an operation with respect to the machine tool and a transportation device moving with the robot mounted thereon, and also relates to a system which includes the machine tool and the robot-mounted transportation device. The present disclosure further relates to an image processing method and an image processing apparatus.

2. Description of the Related Art

A known example of a system as mentioned above is disclosed in Japanese Unexamined Patent Application Publication No. 2017-132002. This system is configured such that an automatic guided vehicle (AGV) having a robot mounted thereon moves to an operation position set with respect to a machine tool, and the robot performs operations, such as attachment and removal of a workpiece, with respect to the machine tool at the operation position.

Such a system enables a single robot which is moved by an automatic guided vehicle to perform operations, such as attachment and removal of a workpiece, with respect to more than one machine tool. Therefore, as compared with a system in which a robot is arranged in a fixed manner with respect to a machine tool, the degree of freedom in machine tool layout is increased so that a machine tool layout which provides enhanced production efficiency is possible. Further, since it is possible to cause a single robot to perform operations with respect to many machine tools, equipment costs are reduced as compared with the conventional system in which the robot is arranged in a fixed manner.

However, because the automatic guided vehicle is configured to move itself by means of wheels, the automatic guided vehicle cannot always be stopped at the operation position with high positioning accuracy. Therefore, in order that the robot accurately performs operations with respect to the machine tool, it is necessary to, when the automatic guided vehicle is positioned at the operation position, compare the pose of the robot with a reference pose of the robot, which is set in so-called teaching and serves as a reference for control, detect an amount of error between them, and compensate an operating pose of the robot based on the detected amount of error.

A known technique for such robot-pose compensation is disclosed as a position compensation method in Japanese Unexamined Patent Application Publication No. 2016-221622. Specifically, this position compensation method is configured such that a visual target consisting of two calibration markers is arranged on an outer surface of the machine tool, images of the visual target are captured by a camera arranged on a movable part of the robot, a relative positional relation between the robot and the machine tool is measured based on the captured images and the position and pose of the camera, and an operating pose of the robot is compensated based on the measured positional relation.

However, in the above-described conventional position compensation method, for example, when a hand or the like of the robot is inserted in the machine tool to cause the hand to attach or remove a workpiece to or from a chuck or the like of the machine tool, the pose of the robot for performing the attachment or removal is not accurately compensated.

Specifically, because the automatic guided vehicle is configured to be moved by operation of the wheels that have a relatively high degree of freedom, the automatic guided vehicle has the characteristics that the robot-mounted surface is easily tilted toward the floor and that the tilt of the robot-mounted surface easily varies due to change of the pose of the robot mounted thereon, in other words, due to change of the position of the center of gravity of the robot.

Therefore, when the robot is in a pose having the hand thereof inserted in the machine tool to attach or remove a workpiece, in other words, when an arm of the robot is overhanging to a great extent from the automatic guided vehicle, the tilt of the robot-mounted surface is greater than that when the hand of the robot is positioned outside the machine tool and the arm is not overhanging from the automatic guided vehicle or is overhanging only to a very slight extent.

Therefore, where, as in the above-described conventional position compensation method, a visual target as a calibration marker is arranged on an outer surface of the machine tool and an amount of position compensation (amount of pose compensation) for the robot is obtained with the robot positioned outside the machine tool, the pose of the robot for attachment or removal of a workpiece that is performed with the hand of the robot positioned inside the machine tool cannot be accurately compensated based on the obtained amount of position compensation.

Where the pose of the robot for attachment or removal of a workpiece cannot be accurately compensated, the hand of the robot cannot be accurately positioned with respect to the chuck. For example, in the case where the chuck is such that its clamping part has only a very small movement allowance (stroke), i.e., there is only a very small clearance between the workpiece and the chuck, such as in the case of a collet chuck, the chuck may fail to reliably clamp the workpiece.

Further, where attachment or removal of a workpiece is not reliably carried out, availability of the system is reduced.

SUMMARY OF THE INVENTION

Accordingly, the present disclosure provides a system, a transportation device, an image processing method, and an image processing apparatus as set forth in the appended claims.

In the present disclosure, an operating pose of the robot is compensated based on an image including an identification figure, so that the operating pose of the robot is compensated more accurately.

Further, in the present disclosure, an operating pose of the robot is compensated based on an image including an internal structure of the machine tool, so that the operating pose of the robot is compensated more accurately.

BRIEF DESCRIPTION OF THE DRAWINGS

FIG. 16 is a diagram illustrating another variation of the configuration with the identification figure arranged in the machine tool.

DETAILED DESCRIPTION OF THE INVENTION

Hereinafter, a specific embodiment of the present invention will be described with reference to the drawings.

Configuration of System According to this Embodiment

Figure 1:
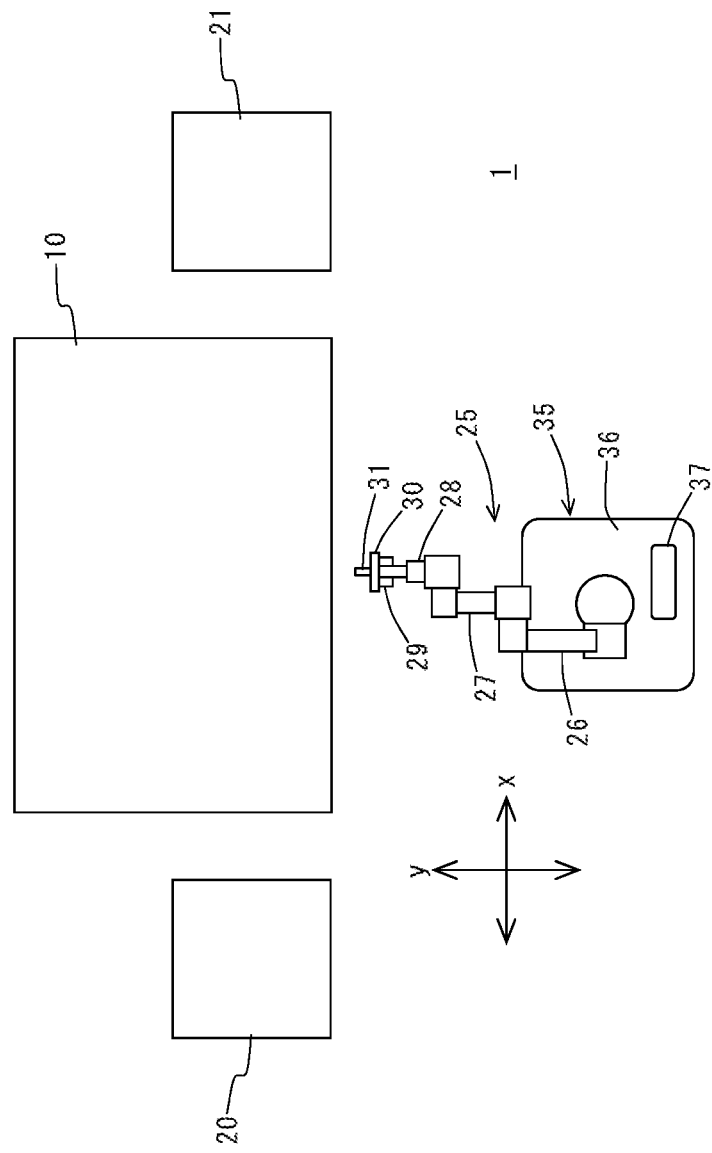
FIG. 1 is a plan view schematically illustrating a structure of a system according to an embodiment of the present invention.
Figure 2:
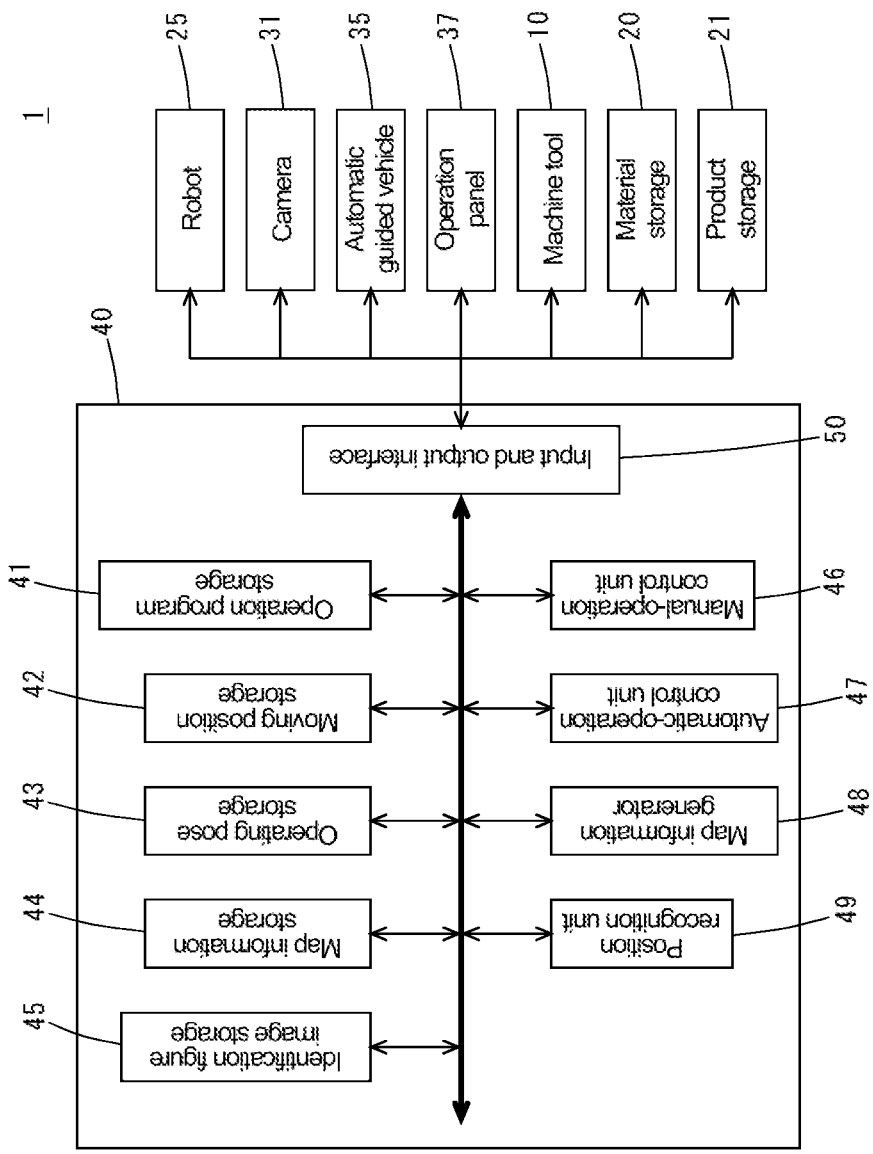
FIG. 2 is a block diagram illustrating a configuration of the system according to the embodiment.

As illustrated in FIGS. 1 and 2, a system 1 according to this embodiment includes a machine tool 10, a material storage 20 and a product storage 21 as peripheral devices, an automatic guided vehicle (AGV) 35, a robot 25 mounted on the automatic guided vehicle 35, a camera 31 attached to the robot 25, and a controller 40 controlling the robot 25 and the automatic guided vehicle 35. Note that the robot 25, the automatic guided vehicle 35, and the controller 40 constitute a robot-mounted transportation device.

Figure 4:
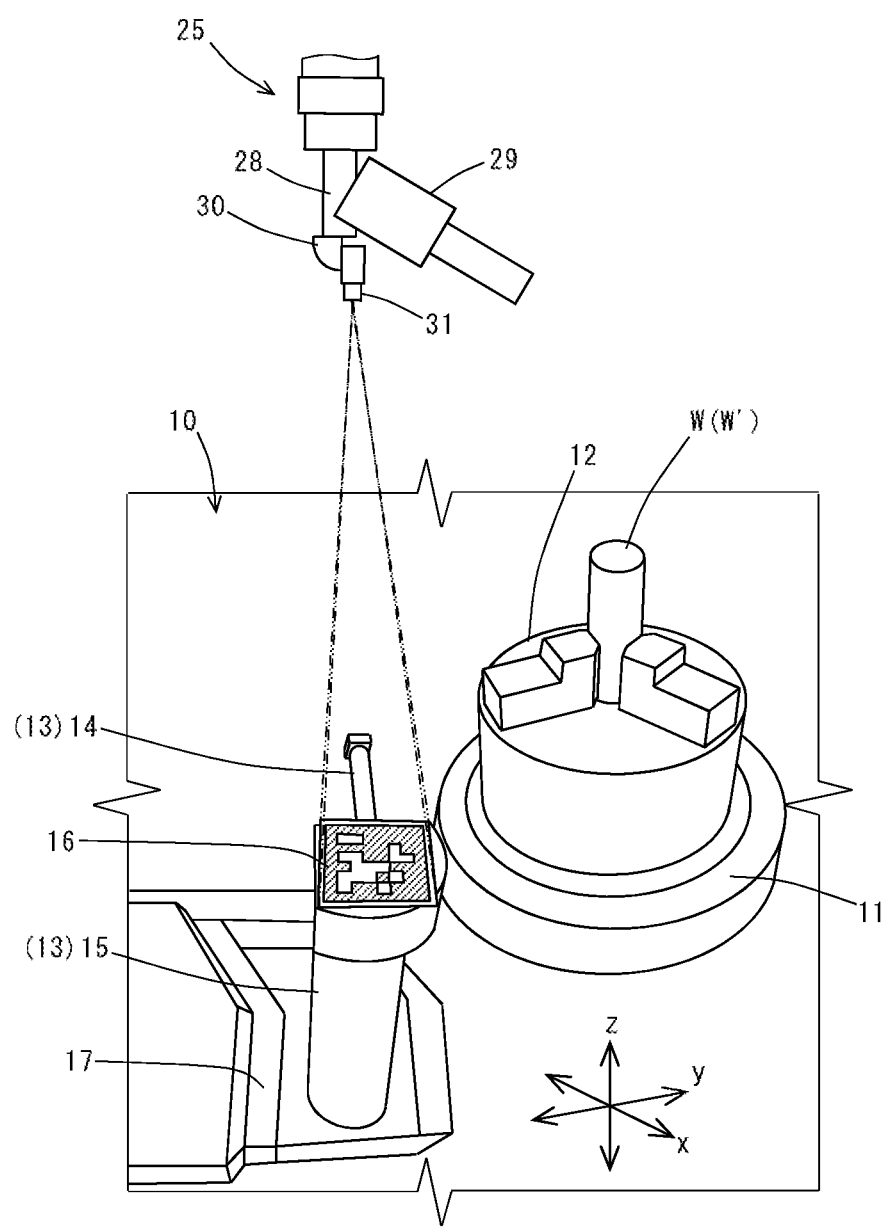
FIG. 4 is a diagram for explaining an image capturing pose of the robot in the embodiment.
Figure 6:
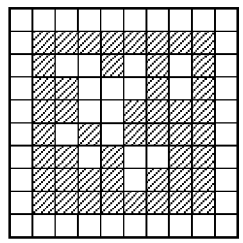
FIG. 6 is a diagram illustrating an identification figure in the embodiment.

As illustrated in FIG. 4, the machine tool 10 is an NC (numerically-controlled) vertical lathe having a spindle 11 arranged vertically to which a chuck 12 for clamping a workpiece W (W') is attached. The machine tool 10 is capable of performing turning on a workpiece W (W'). The machine tool 10 has a tool presetter 13 arranged in the vicinity of the spindle 11. The tool presetter 13 has a contactor 14 and a support bar 15 supporting the contactor 14. The support bar 15 is movable into and out of a machining area along an axis of the spindle 11 and has a display board 16, which is made of, for example but not limited to, ceramics, provided on an end surface thereof located on the machining area side. The display board 16 has an identification figure, as illustrated in FIG. 6, drawn thereon. Note that the display board 16 is arranged to be on a horizontal plane. Thus, the identification figure in this embodiment is disposed in the machine tool 10 and it is arranged in the machining area, which is a particularly preferable configuration.

FIG. 4 shows a state where the support bar 15 and the contactor 14 have been moved into the machining area. After the support bar 15 and the contactor 14 are moved out of the machining area so that the contactor 14 and the display board 16 are retracted into a storage space, a shutter 17 is closed so that the contactor 14 and the display board 16 are isolated from the machining area.

The identification figure in this example has a matrix structure having a plurality of square pixels arranged two-dimensionally, each pixel being displayed in white or black. In FIG. 6, the pixels displayed in black are hatched. Examples of the identification figure include so-called "AR marker" and "AprilTag". Further, where a small identification figure is used, some measure, e.g., arranging a lens over the identification figure, may be taken to enable the camera 31, which is described later, to capture an enlarged image of the identification figure.

The material storage 20 is disposed on the left of the machine tool 10 in FIG. 1. The material storage 20 stores therein materials (unmachined workpieces W) to be machined in the machine tool 10. The product storage 21 is disposed on the right of the machine tool 10 in FIG. 1. The product storage 21 stores therein products or semi-finished products (machined workpieces W') machined in the machine tool 10.

As illustrated in FIG. 1, the automatic guided vehicle 35 has a mount surface 36 as its top surface, on which the robot 25 is mounted. Further, the automatic guided vehicle 35 has an operation panel 37 attached thereto which an operator can carry around. The operation panel 37 has an input and output unit for input and output of data, an operation unit for manual operation of the automatic guided vehicle 35 and the robot 25, and a display capable of displaying a picture thereon.

Further, the automatic guided vehicle 35 has a sensor (for example, a distance measurement sensor using a laser beam) which enables recognition of the position of the automatic guided vehicle 35 in a plant, and the automatic guided vehicle 35 is configured to travel tracklessly in the plant, including the area where the machine tool 10, the material storage 20, and the product storage 21 are disposed, under control by the controller 40. The automatic guided vehicle 35 in this embodiment moves to operation positions respectively set with respect to the machine tool 10, the material storage 20, and the product storage 21.

Figure 3:
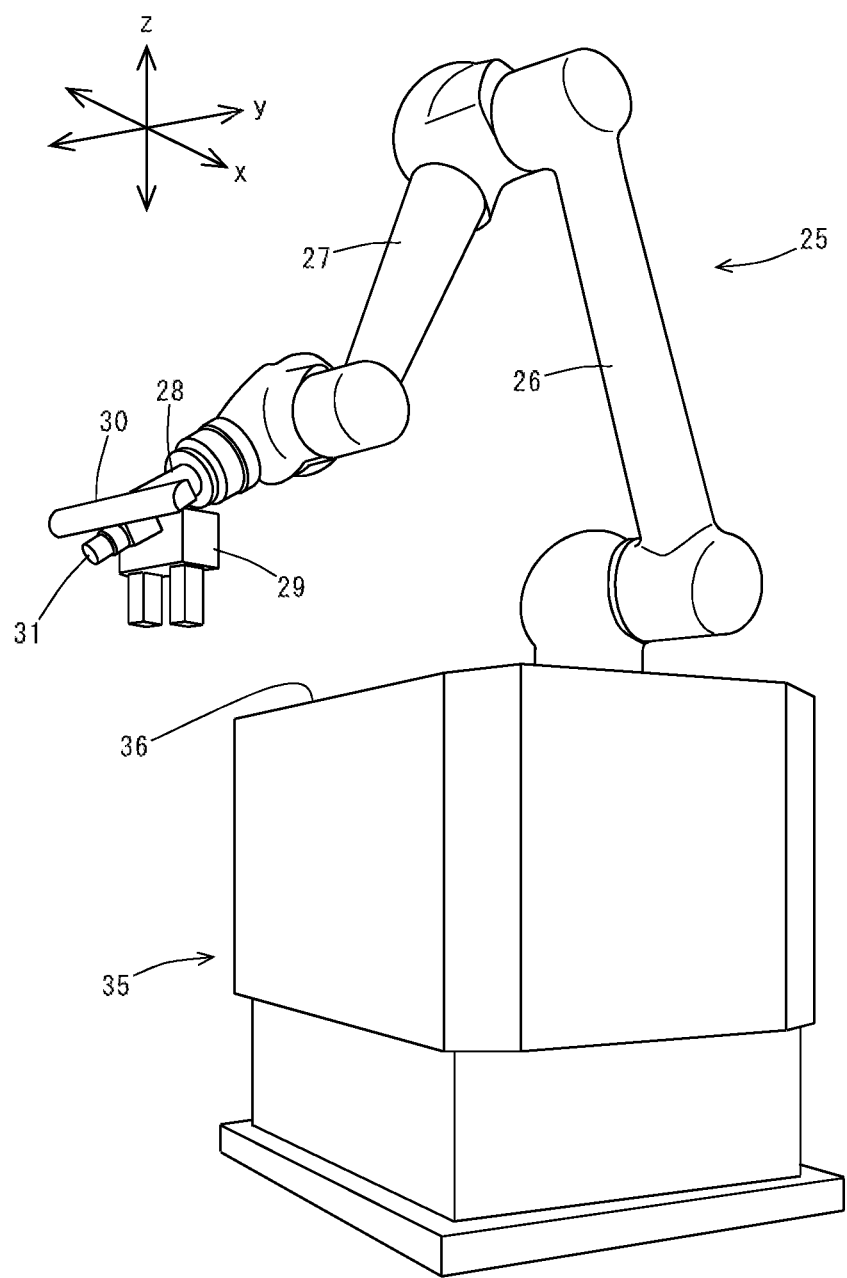
FIG. 3 is a perspective view illustrating an automatic guided vehicle and a robot in the embodiment.

As illustrated in FIGS. 1 and 3, the robot 25 in this embodiment is an articulated robot having three arms, namely, a first arm 26, a second arm 27, and a third arm 28. The third arm 28 has a hand 29 as an end effector attached to a distal end thereof, and also has one camera 31 attached to the distal end thereof via a support bar 30. Note that the robot applicable in the present invention is not limited to this configuration. The robot needs only to have (i) a camera, (ii) a hand unit for gripping a workpiece or a tool, (iii) a second arm unit to which the hand unit is movably connected, and (iv) a first arm unit to which the second arm unit is movably connected. As compared with the robot 25 in this embodiment, the hand 29 corresponds to the hand unit, the second arm 27 and a joint rotatably (movably) coupled to the second arm 27 correspond to the second arm unit, and the first arm 26 and a joint rotatably (movably) coupled to the first arm 26 correspond to the first arm unit. Note that the third arm 28 and a joint rotatably and reciprocatably (movably) coupled to the third arm 28 may be deemed to correspond to the second arm unit. That is to say, although the robot in this embodiment has three arms, the robot needs only to have at least two arms.

As illustrated in FIG. 2, the controller 40 in this embodiment consists of an operation program storage 41, a moving position storage 42, an operating pose storage 43, a map information storage 44, an identification figure image storage 45, a manual-operation control unit 46, an automatic-operation control unit 47, a map information generator 48, a position recognition unit 49, and an input and output interface 50. The controller 40 is connected to the machine tool 10, the material storage 20, the product storage 21, the robot 25, the camera 31, the automatic guided vehicle 35, and the operation panel 37 via the input and output interface 50. Note that the controller 40 is not limited to this configuration. The controller 40 needs only to include at least a functional unit for controlling the robot 25, and other functional units may be included in other devices.

Note that the controller 40 is composed of a computer including a CPU, a RAM, and a ROM. The manual-operation control unit 46, the automatic-operation control unit 47, the map information generator 48, the position recognition unit 49, and the input and output interface 50 are functionally implemented by a computer program to carry out the processes described later. The operation program storage 41, the moving position storage 42, the operating pose storage 43, the map information storage 44, and the identification figure image storage 45 are composed of an appropriate storage medium, such as a RAM. In this embodiment, the controller 40 is attached to the automatic guided vehicle 35, and is connected to the machine tool 10, the material storage 20, and the product storage 21 through appropriate communication means and connected to the robot 25, the camera 31, the automatic guided vehicle 35, and the operation panel 37 by wire or wirelessly. However, the controller 40 is not limited to this configuration and may be disposed at an appropriate position other than the automatic guided vehicle 35. In such a case, the controller 40 is connected to the above-mentioned elements through appropriate communication means.

The manual-operation control unit 46 is a functional unit that operates the automatic guided vehicle 35, the robot 25, and the camera 31 in accordance with operation signals input through the operation panel 37 by an operator. That is to say, an operator can manually operate the automatic guided vehicle 35, the robot 25, and the camera 31 through the operation panel 37, which is controlled by the manual-operation control unit 46.

The operation program storage 41 is a functional unit that stores therein an automatic-operation program for causing the automatic guided vehicle 35 and the robot 25 to automatically operate during production, and a map generation program for causing the automatic guided vehicle 35 to operate during generation of map information of the plant, which is described later. The automatic-operation program and the map generation program are stored into the operation program storage 41, for example, by being input through the input and output unit of the operation panel 37.

The automatic-operation program contains command codes regarding a moving position as a target position to which the automatic guided vehicle 35 is moved, a moving speed of the automatic guided vehicle 35, and an orientation of the automatic guided vehicle 35. The automatic-operation program further contains command codes regarding operations to be carried out in sequence by the robot 25 and command codes for causing the camera 31 to operate. The map generation program contains command codes for causing the automatic guided vehicle 35 to travel tracklessly all over the plant to cause the map information generator 48 to generate map information.

The map information storage 44 is a functional unit that stores therein map information including information on arrangement of machines, devices, instruments, etc. (hereinafter, collectively referred to as "devices") arranged in the plant where the automatic guided vehicle 35 travels. The map information is generated by the map information generator 48.

The map information generator 48 obtains spatial information of the plant from distance data detected by the sensor when the automatic guided vehicle 35 is caused to travel in accordance with the map generation program stored in the operation program storage 41 under control by the automatic-operation control unit 47, which is described in detail later, of the controller 40. The map information generator 48 also recognizes planar shapes of the devices arranged in the plant, and, for example, based on previously registered planar shapes of the devices, recognizes the positions, planar shapes, etc. of particular devices (in this example, the machine tool 10, the material storage 20, and the product storage 21) arranged in the plant (arrangement information). The map information generator 48 stores the obtained spatial information and arrangement information as map information of the plant into the map information storage 44.

The position recognition unit 49 is a functional unit that recognizes the position of the automatic guided vehicle 35 in the plant based on distance data detected by the sensor and the map information of the plant stored in the map information storage 44. Based on the position of the automatic guided vehicle 35 recognized by the position recognition unit 49, the automatic-operation control unit 47 controls operation of the automatic guided vehicle 35.

The moving position storage 42 is a functional unit that stores therein specific moving positions. The moving positions are specific target positions to which the automatic guided vehicle 35 is moved, and correspond to the above-described command codes contained in the operation programs. The moving positions include the above-mentioned operation positions set with respect to the machine tool 10, the material storage 20, and the product storage 21. Note that the moving positions are set, for example, as follows: the automatic guided vehicle 35 is manually operated through the operation panel 37 so that it is moved to each targeted position under control by the manual-operation control unit 46, and position data recognized by the position recognition unit 49 at each targeted position is stored into the moving position storage 42. This operation is generally called "teaching operation".

The operating pose storage 43 is a functional unit that stores therein data regarding poses (operating poses) of the robot 25, into which the robot 25 is brought in sequence when it is operated in a predetermined sequence. The operating poses correspond to the command codes contained in the operation program. This operating pose data is composed of rotational angle data of joints (motors) of the robot 25 in each targeted pose. This rotational angle data is obtained by, in the teaching operation using the operation panel 37, manually operating the robot 25 to bring the robot 25 into each targeted pose under control by the manual-operation control unit 46. The obtained rotational angle data is stored as operating pose data into the operating pose storage 43.

Specific operating poses of the robot 25 are set with respect to each of the material storage 20, machine tool 10, and product storage 21. For example, a set of extraction poses is set with respect to the material storage 20, the set of extraction poses consisting of an operation starting pose (extraction starting pose) for starting extraction with respect to the material storage 20, operating poses (extracting poses) for causing the hand 29 to grip an unmachined workpiece W stored in the material storage 20 and extract the unmachined workpiece W from the material storage 20, and a pose for finishing the extraction (extraction finishing pose; in this embodiment, this pose is identical to the extraction starting pose).

A set of workpiece-removal poses for removing a machined workpiece W' from the machine tool 10 and a set of workpiece-attachment poses for attaching an unmachined workpiece W to the machine tool 10 are set with respect to the machine tool 10.

Specifically, the set of workpiece-removal poses consists of, for example, an operation starting pose preceding insertion into the machine tool 10, a pose for moving the hand 29 and the camera 31 into the machining area of the machine tool 10 and casing the camera 31 to capture an image of the identification figure provided on the support bar 15 (image capturing pose; see FIG. 4), a pose for positioning the hand 29 opposite a machined workpiece W' clamped by the chuck 12 of the machine tool 10 (removal preparing pose), a pose for moving the hand 29 toward the chuck 12 and causing the hand 29 to grip the machined workpiece W' clamped by the chuck 12 (gripping pose), a pose for moving the hand 29 away from the chuck 12 to pull the machined workpiece W' from the chuck 12 (pulling pose), and a pose for moving the hand 29 and the camera 31 out of the machine tool 10 (operation finishing pose).

The set of workpiece-attachment poses consists of, for example, an operation starting pose preceding insertion into the machine tool 10, a pose for moving the hand 29 and the camera 31 into the machining area of the machine tool 10 and causing the camera 31 to capture an image of the identification figure provided on the support bar 15 (image capturing pose; see FIG. 4), a pose for positioning a unmachined workpiece W gripped by the hand 29 opposite the chuck 12 of the machine tool 10 (attachment preparing pose), a pose for moving the hand 29 toward the chuck 12 to allow the chuck 12 to clamp the unmachined workpiece W (attaching pose), a pose for moving the hand 29 away from the chuck 12 (moving-away pose), and a pose for moving the hand 29 and the camera 31 out of the machine tool 10 (operation finishing pose).

A set of storage poses is set with respect to the product storage 21, the set of storage poses consisting of an operation starting pose for starting storage with respect to the product storage 21 (storage starting pose), operating poses for storing a machined workpiece W' gripped by the hand 29 into the product storage 21 (storing poses), and a pose for finishing the storage (storage finishing pose; in this embodiment, this pose is identical to the storage starting pose).

The identification figure image storage 45 is a functional unit that stores therein images of the identification figure provided on the support bar 15 of the tool presetter 13 captured by the camera 31 when the automatic guided vehicle 35 is at the operation position set with respect to the machine tool 10 and the robot 25 is in the image capturing pose in the teaching operation and in automatic operation. Note that the image of the identification figure captured in the teaching operation is stored as a reference image in the identification figure image storage 45. Note further that an image capturing pose position, an attaching pose position, and other positions in a figure coordinate system are stored in an appropriate storage.

The automatic-operation control unit 47 is a functional unit that operate the automatic guided vehicle 35, the robot 25, and the camera 31 in accordance with the automatic-operation program or map generation program stored in the operation program storage 41. In this process, the data stored in the moving position storage 42 and the operating pose storage 43 are used as necessary.

Unmanned and Automated Production in System According to this Embodiment

In the system 1 according to this embodiment, unmanned and automated production is performed in the following manner under control by the automatic-operation control unit 47.

That is to say, the automatic-operation program stored in the operation program storage 41 is executed by the automatic-operation control unit 47, so that, for example, the automatic guided vehicle 35 and the robot 25 operate in the following manner.

First, the automatic guided vehicle 35 is moved to the operation position set with respect to the machine tool 10 and the robot 25 is brought into the operation starting pose for the above-described workpiece removal. At this time, the machine tool 10 has finished a predetermined machining operation, a door cover thereof has been opened so that the robot 25 can enter the machining area, and the support bar 15 of the tool presetter 13 has been moved into the machining area upon receipt of a command from the automatic-operation control unit 47.

Subsequently, the automatic-operation control unit 47 causes the robot 25 to carry out the rest of the workpiece removal, so that a machined workpiece W' clamped by the chuck 12 of the machine tool 10 is gripped by the hand 29 and removed from the machine tool 10. In this process, the automatic-operation control unit 47 causes the camera 31 to capture an image of the identification figure when the robot 25 is in the image capturing pose, and compensates the subsequent removal preparing pose, gripping pose, and pulling pose based on the captured image. As mentioned in the foregoing, the automatic guided vehicle 35 stops at the operation position with low positioning accuracy since the automatic guided vehicle 35 is configured to move itself by means of wheels. Therefore, in actual operation, it is necessary to compensate the operating poses set in advance in the teaching operation. A specific manner of this compensation is described later. Note that, after bringing the robot 25 into the gripping pose, the automatic-operation control unit 47 transmits a chuck open command to the machine tool 10 to open the chuck 12.

Subsequently, the automatic-operation control unit 47 moves the automatic guided vehicle 35 to the operation position set with respect to the product storage 21 and brings the robot 25 in sequence into the storage starting pose for starting storage with respect to the product storage 21, the storing poses for storing the machined workpiece gripped by the hand 29 into the product storage 21, and the storage finishing pose for finishing the storage. Thereby, the machined workpiece gripped by the hand 29 is stored into the product storage 21.

Subsequently, the automatic-operation control unit 47 moves the automatic guided vehicle 35 to the operation position set with respect to the material storage 20 and brings the robot 25 in sequence into the extraction starting pose for staring extraction with respect to the material storage 20, the extracting poses for causing the hand 29 to grip an unmachined workpiece stored in the material storage 20 and extract the unmachined workpiece from the material storage 20, and the extraction finishing pose for finishing the extraction. Thereby, an unmachined workpiece is gripped by the hand 29.

Subsequently, the automatic-operation control unit 47 moves the automatic guided vehicle 35 to the operation position set with respect to the machine tool 10 again, and causes the robot 25 to carry out the above-described workpiece attachment, so that the unmachined workpiece W gripped by the hand 29 is attached to the chuck 12 of the machine tool 10, after which the hand 29 is moved out of the machine tool 10. In this process, the automatic-operation control unit 47 causes the camera 31 to capture an image of the identification figure when the robot 25 is in the image capturing pose, and compensates the subsequent attachment preparing pose, attaching pose, and moving-away pose based on the captured image. Thereafter, the automatic-operation control unit 47 transmits a machining start command to the machine tool 10 to cause the machine tool 10 to perform a machining operation. Note that, after bringing the robot 25 into the attaching pose, the automatic-operation control unit 47 transmits a chuck close command to the machine tool 10 to close the chuck 12, so that the unmachined workpiece W is clamped by the chuck 12.

In the system 1 according to this embodiment, unmanned and automated production is continuously performed by repeating the above-described series of processes.

[Compensation of Operating Poses]

A manner of the above-mentioned compensation of the operating poses of the robot 25 in the operations carried out with respect to the machine tool 10 is described below.

<Basic Idea for Compensation>

Figure 5:
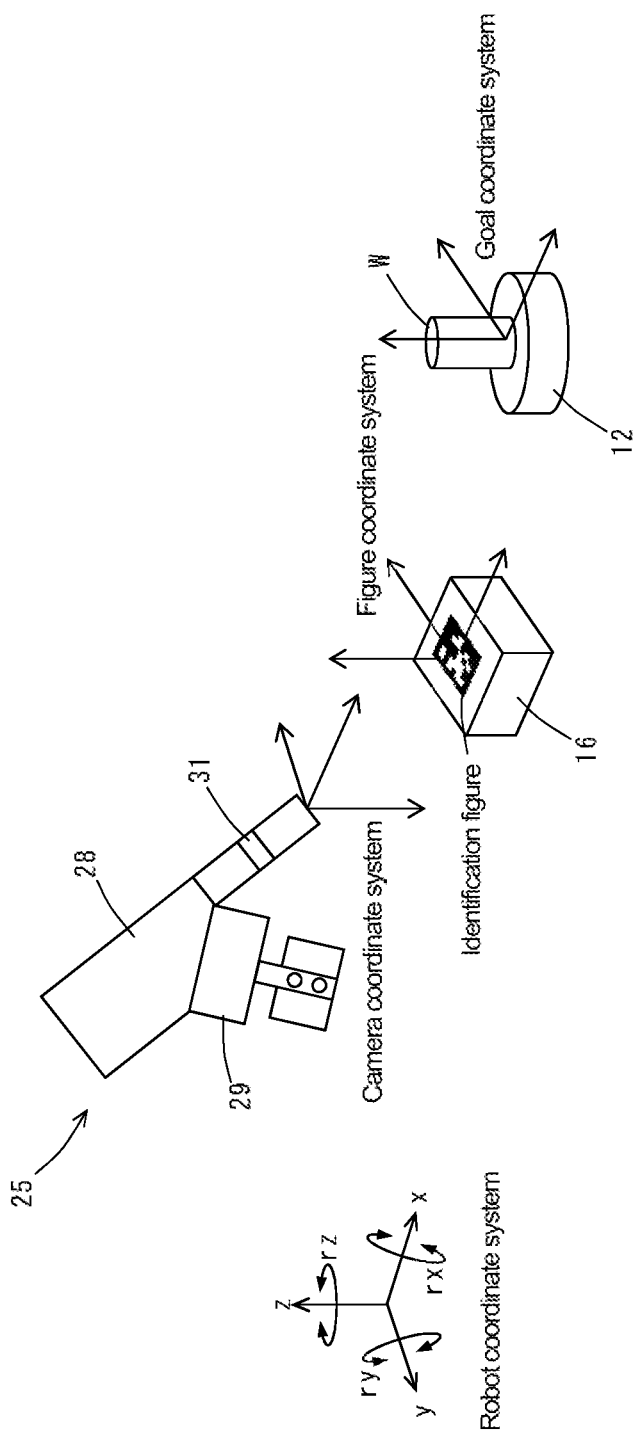
FIG. 5 is a diagram illustrating a relation between coordinate systems set in the embodiment.

First of all, a basic idea for the pose compensation in this embodiment is described. As shown in FIG. 5, a robot coordinate system, a camera coordinate system, a figure coordinate system, and a goal coordinate system are set with respect to the robot 25, the camera 31, the identification figure, and a targeted operating position (target operating position), respectively. These coordinate systems are each defined by three orthogonal axes x, y, and z. The origin of the robot coordinate system is set at a freely selected point within a control space for the automatic-operation control unit 47 (in this embodiment, it is set at a point corresponding to the root of the robot arm). The origin of the camera coordinate system is, for example, set at the center of an image sensor of the camera 31 that is arranged in a two-dimensional planar manner. The origin of the figure coordinate system is set at the center of the identification figure. The origin of the goal coordinate system is set at the target operating position. In FIG. 5, for the sake of expediency, only the robot coordinate system is denoted by reference signs. In FIG. 5, the target operating position for the robot 25 is a position in front of the chuck 12 at which the hand 29 is positioned to cause the chuck 12 to clamp a workpiece W. At the position in front of the chuck 12, the hand 29 is positioned such that the axis of the workpiece W is coaxial with the axis of the chuck 12. Moving the hand 29 in this state in the minus z-axis direction allows the chuck 12 to clamp the workpiece W.

A transformation matrix for transformation from the robot coordinate system to the camera coordinate system, which is calculated based on coordinate values (x, y, z) and rotational angle values (rx, ry, rz) around coordinate axes of the camera 31 in the robot coordinate system that are obtained from control space information of the automatic-operation control unit 47 and machine design data (for example, CAD data) of the robot 25 and the camera 31, is defined as $M_{camera}^{robot}$. In the same manner, a transformation matrix $M_{robot}^{camera}$ for transformation from the camera coordinate system to the robot coordinate system also can be calculated (obtained).

Further, a transformation matrix for transformation from the camera coordinate system to the figure coordinate system, which is calculated based on coordinate values (x, y, z) and rotational angle values (rx, ry, rz) around coordinate axes of the identification figure in the camera coordinate system that can be obtained from internal parameters of the camera 31, a homography matrix, a center coordinate, and corner coordinates recognized from a captured image of the identification figure, and the size of the identification figure, is defined as $M_{fig}^{camera}$. In the same manner, a transformation matrix for transformation from the figure coordinate system to the camera coordinate system is defined as $M_{camera}^{fig}$.

<Processing of Data Obtained in Teaching Operation>

The automatic-operation control unit 47 first obtains a transformation matrix $M_{camera\_teach}^{fig}$ for transformation from the figure coordinate system to the camera coordinate system in the teaching operation (hereinafter, "teaching-operation camera coordinate system") and a transformation matrix $M_{fig}^{camera\_teach}$ for transformation from the teaching-operation camera coordinate system to the figure coordinate system based on the image of the identification figure (reference image) captured in the teaching operation and stored in the identification figure image storage 45.

Subsequently, the automatic-operation control unit 47 calculates a transformation matrix $M_{robot\_teach}^{goal}$ for transformation from the goal coordinate system for the hand 29 to the robot coordinate system in the teaching operation (hereinafter, "teaching-operation robot coordinate system") in accordance with a predetermined transformation equation, which is set for the purpose of control, for the operating poses obtained in the teaching operation and stored in the operating pose storage 43. Thereafter, the automatic-operation control unit 47 calculates a transformation matrix $M_{fig}^{goal}$ for transformation from the goal coordinate system to the figure coordinate system in accordance with Equation 1 below based on the calculated transformation matrix $M_{robot\_teach}^{goal}$.

$$M_{fig}^{goal} = M_{fig}^{camera\_teach} \cdot M_{robot\_teach}^{goal} \qquad \text{(Equation 1)}$$

In Equation 1, $M_{fig}^{robot\_teach}$ is a transformation matrix for transformation from the teaching-operation robot coordinate system to the figure coordinate system that can be calculated in accordance with Equation 2 below.

$$M_{fig}^{robot\_teach} = M_{fig}^{camera\_teach} \cdot M_{camera\_teach}^{robot\_teach} \quad \text{(Equation 2)}$$

Note that the transformation matrix $M_{fig}^{camera\_teach}$ is, as described above, calculated based on the image of the identification figure captured in the teaching operation. Further, the transformation matrix $M_{camera\_teach}^{robot\_teach}$ is, as described above, obtained based on the control space information of the automatic-operation control unit 47 and the machine design data (for example, CAD data) of the robot 25 and the camera 31.

<Compensation of Actual Operating Poses>

The automatic-operation control unit 47 first calculates (obtains) a transformation matrix $M_{camera\_teach}^{fig}$ for transformation from the figure coordinate system to the camera coordinate system in actual operation (hereinafter, "actual-operation camera coordinate system" and sometimes referred to as "current camera coordinate system") and a transformation matrix $M_{fig}^{camera\_current}$ for transformation from the actual-operation camera coordinate system to the figure coordinate system based on an image of the identification figure captured by the camera 31 in the actual operation.

Subsequently, the automatic-operation control unit 47 calculates a transformation matrix $M_{robot\_current}^{goal}$ for transformation from the goal coordinate system to the robot coordinate system in the actual operation (hereinafter, "actual-operation robot coordinate system") in accordance with Equation 3 below based on the transformation matrix $M_{fig}^{goal}$ for transformation from the goal coordinate system to the figure coordinate system that is calculated in accordance with Equation 1 above.

$$M_{robot\_current}^{goal} = M_{robot\_current}^{fig} \cdot M_{fig}^{goal} \quad \text{(Equation 3)}$$

In Equation 3, $M_{robot\_current}^{fig}$ is a transformation matrix for transformation from the figure coordinate system to the actual-operation robot coordinate system that can be calculated in accordance with Equation 4 below.

$$M_{robot\_current}^{fig} = M_{robot\_current}^{camera\_current} \cdot M_{camera\_current}^{fig} \quad \text{(Equation 4)}$$

Note that the transformation matrix $M_{robot\_current}^{camera\_current}$ is a transformation matrix for transformation from the actual-operation camera coordinate system to the actual-operation robot coordinate system that is, as described above, obtained based on the control space information of the automatic-operation control unit 47 and the machine design data (for example, CAD data) of the robot 25 and the camera 31. Further, the transformation matrix $M_{camera\_current}^{fig}$ as described above, obtained based on the image of the identification figure captured in the actual operation.

Subsequently, the automatic-operation control unit 47 calculates a target operating position ($x_{robot\_current}^{goal}$, $y_{robot\_current}^{goal}$, $z_{robot\_current}^{goal}$) and a target operating angle ($rx_{robot\_current}^{goal}$, $ry_{robot\_current}^{goal}$, $rz_{robot\_current}^{goal}$) for the robot 29 in the actual-operation robot coordinate system in accordance with Equations 5, 6, and 7 below based on the calculated (compensated) transformation matrix $M_{robot\_current}^{goal}$ for transformation from the goal coordinate system to the actual-operation robot coordinate system.

$$M_{robot\_current}^{goal} = \begin{bmatrix} R_{robot\_current}^{goal} & T_{robot\_current}^{goal} \\ 0 & 1 \end{bmatrix} \quad \text{(Equation 5)}$$

$$T_{robot\_current}^{goal} = \begin{bmatrix} x_{robot\_current}^{goal} \\ y_{robot\_current}^{goal} \\ z_{robot\_current}^{goal} \end{bmatrix} \quad \text{(Equation 6)}$$

$$R_{robot\_current}^{goal} = \begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \cdot \quad \text{(Equation 7)}$$

$$\begin{bmatrix} 1 & 0 & 0 \\ 0 & \cos\psi & -\sin\psi \\ 0 & \sin\psi & \cos\psi \end{bmatrix}$$

Figure 7:
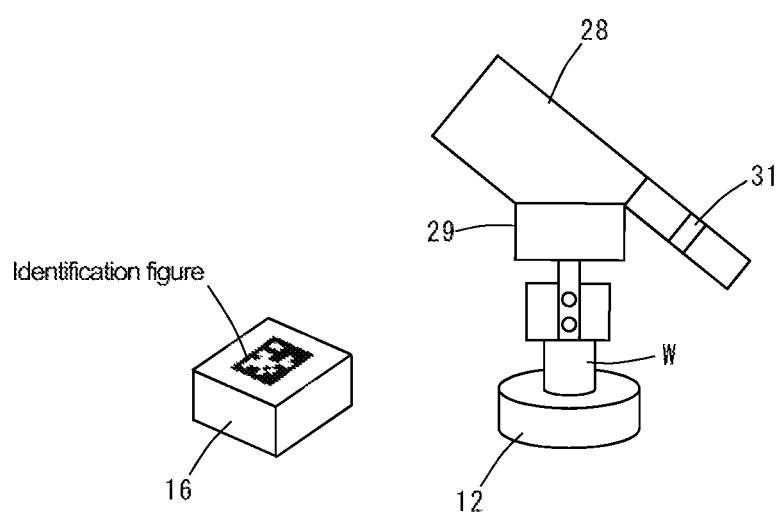
FIG. 7 is a diagram illustrating an operating pose of a hand compensated based on an image of the identification figure captured in actual operation in the case where there is no error between an image capturing pose of a camera in teaching operation and an image capturing pose of the camera in the actual operation.

Note that $\psi$, $\theta$, and $\varphi$ in Equation 7 are $rx_{robot\_current}^{goal}$, $ry_{robot\_current}^{goal}$, and $rz_{robot\_current}^{goal}$, respectively. The hand 29 is moved to the compensated target operating position ($x_{robot\_current}^{goal}$, $y_{robot\_current}^{goal}$, $z_{robot\_current}^{goal}$), e.g., the position indicated in FIG. 7, and rotated to the target operating angle ($rx_{robot\_current}^{goal}$, $ry_{robot\_current}^{goal}$, $rz_{robot\_current}^{goal}$). The example shown in FIG. 7 shows a state where the hand 29 of the robot 25 is positioned at the target operating position with no positional error, i.e., at a position in front of the chuck 12 such that the axis of the workpiece W is coaxial with the axis of the chuck 12.

<Compensation of Image Capturing Pose in Actual Operation>

Figure 8:
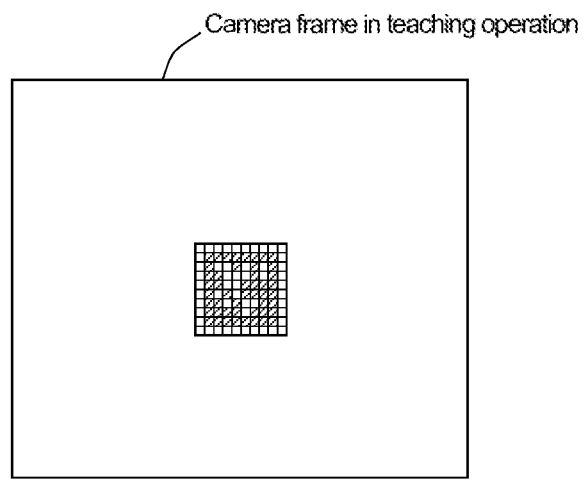
FIG. 8 is a diagram illustrating an image of the identification figure captured by the camera in the teaching operation.
Figure 9:
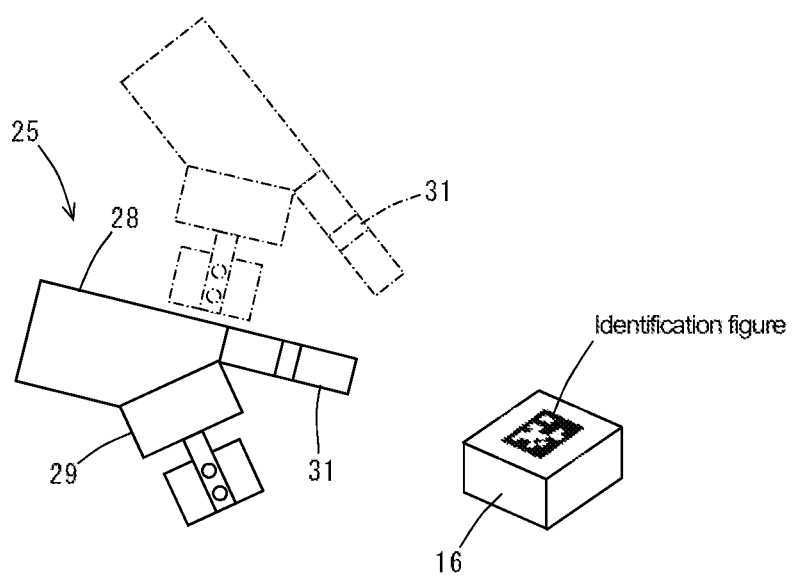
FIG. 9 is a diagram illustrating the case where there is an error between the image capturing pose of the camera in the teaching operation and the image capturing pose of the camera in the actual operation.
Figure 10:
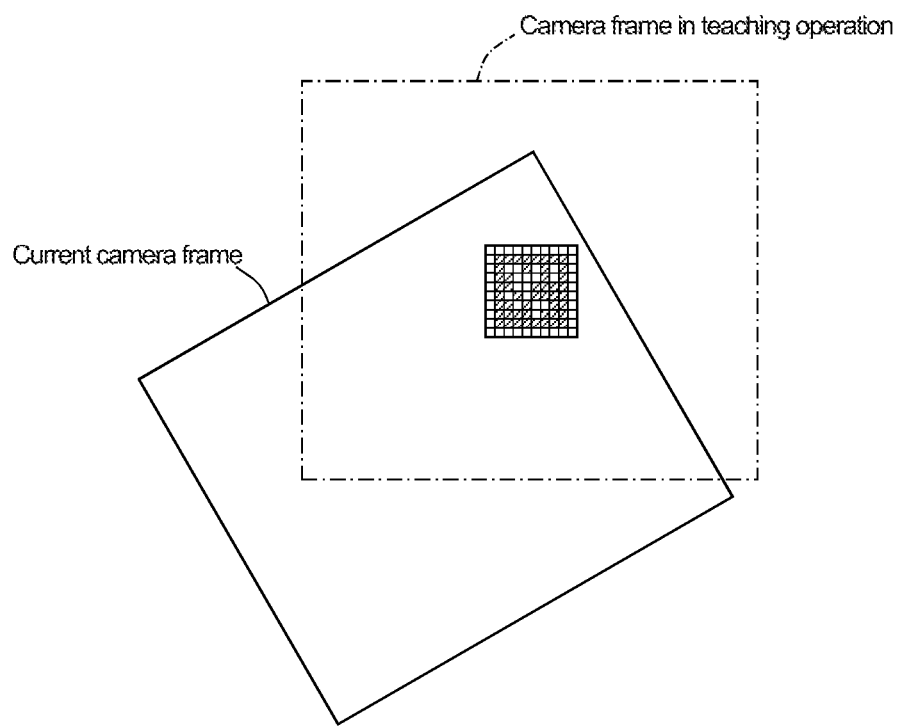
FIG. 10 is a diagram illustrating images of the identification figure captured by the camera as being in the image capturing pose in the teaching operation and as being in the image capturing pose in the actual operation in the case where there is an error between the image capturing pose of the camera in the teaching operation and the image capturing pose of the camera in the actual operation.

By the way, the pose for causing the camera 31 to capture an image of the identification figure in the teaching operation is typically set such that the identification figure is located at substantially the center of a camera frame as shown in FIG. 8, taking into account a positioning error and the like occurring in actual operation. However, if the automatic guided vehicle 35 is positioned with low accuracy in actual operation, as shown in FIG. 9, the pose of the camera 31 in the actual operation (indicated by solid lines) can differ to a great extent from the pose of the camera 31 in the teaching operation (indicated by dotted-and-dashed lines). Where the pose of the camera 31 in actual operation is displaced to a great extent, it is possible that the identification figure is shifted to an edge of the camera frame in the actual operation as shown in FIG. 10 or the camera 31 is positioned closer to or farther from the identification figure.

Figure 11:
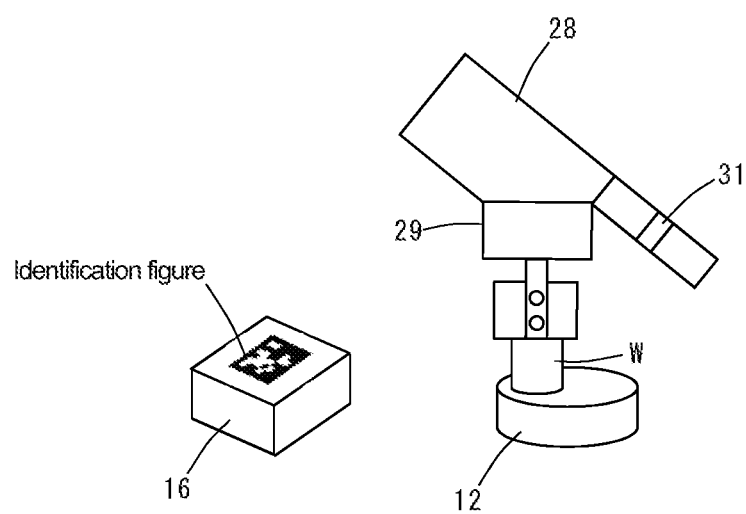
FIG. 11 is a diagram illustrating an operating pose of the hand compensated based on the image of the identification figure captured in the actual operation in the case where there is an error between the image capturing pose of the camera in the teaching operation and the image capturing pose of the camera in the actual operation.

Such a state leads to an unclear image of the identification figure being captured by the camera 31 or leads to a captured image of the identification figure having a larger or smaller size. Such an image causes the transformation matrix $M_{camera\_current}^{fig}$ obtained based on the identification figure to have an error, which results in the transformation matrix $M_{robot\_current}^{goal}$ for transformation from the goal coordinate system to the actual-operation robot coordinate system calculated based on the transformation matrix $M_{camera\_current}^{fig}$, as well as the target operating position ($x_{robot\_current}^{goal}$, $y_{robot\_current}^{goal}$, $z_{robot\_current}^{goal}$) and target operating angle ($rx_{robot\_current}^{goal}$, $ry_{robot\_current}^{goal}$, $rz_{robot\_current}^{goal}$) for the robot 29 in the actual-operation robot coordinate system, also having an error. Consequently, as shown in FIG. 11, it is not possible to position the hand 29 of the robot 25 accurately at the targeted operating position. The example shown in FIG. 11 shows a state where the hand 29 of the robot 25 is positioned at a position shifted from the targeted operating position, i.e., at a position in front of the chuck 12 such that the axis of the workpiece W is shifted from the axis of the chuck 12. If the hand 29 in this state is moved in the minus z-axis direction, the workpiece W collides with the chuck 12, so that the chuck 12 fails to clamp the workpiece W.

Accordingly, this embodiment is configured such that, in the automatic operation carried out by the automatic-operation control unit 47, the image capturing pose in the actual operation is compared with the image capturing pose in the teaching operation, and when an error of the image capturing pose in the actual operation is out of a predetermined allowable range (thresholds), a process of compensating the image capturing pose in the actual operation is carried out so that the error falls within the allowable range. Note that, where the error does not fall within the allowable range after the compensation process is carried out once, the compensation process is repeatedly carried out until the error falls within the allowable range.

<Checking of Image Capturing Pose>

The automatic-operation control unit 47 obtains a pair of figure position and figure angle ($x_{camera\_teach}^{fig}$, $y_{camera\_teach}^{fig}$, $z_{camera\_teach}^{fig}$, $rx_{camera\_teach}^{fig}$, $ry_{camera\_teach}^{fig}$, $rz_{camera\_teach}^{fig}$) in the teaching-operation camera coordinate system by means of the transformation matrix $M_{camera\_teach}^{fig}$ for transformation from the figure coordinate system to the teaching-operation camera coordinate system based on the image of the identification figure captured in the teaching operation. Further, the automatic-operation control unit 47 obtains the transformation matrix $M_{camera\_current}^{fig}$ for transformation from the figure coordinate system to the actual-operation camera coordinate system based on an image of the identification figure captured in actual operation and calculates a pair of figure position and figure angle ($x_{camera\_current}^{fig}$, $y_{camera\_current}^{fig}$, $z_{camera\_current}^{fig}$, $rx_{camera\_current}^{fig}$, $ry_{camera\_current}^{fig}$, $rz_{camera\_current}^{fig}$) in the actual-operation camera coordinate system. Thereafter, the automatic-operation control unit 47 calculates difference values ($\Delta x$, $\Delta y$, $\Delta z$, $\Delta rx$, $\Delta ry$, $\Delta rz$) between the pairs of figure position and figure angle. When the difference values are out of their respective predetermined allowable ranges, i.e., when the following conditions are not completely satisfied, the image capturing pose is compensated:

−0.05 mm≤$\Delta x$≤0.05 mm;
  −0.05 mm≤$\Delta y$≤0.05 mm;
  −0.05 mm≤$\Delta z$≤0.05 mm;
  −0.05°≤$\Delta rx$≤0.05°;
  −0.05°≤$\Delta ry$≤0.05°; and
  −0.05°≤$\Delta rz$≤0.05°.

Note that these thresholds for the difference values are given by way of example only. The thresholds for each difference value are not limited to this example and can be empirically set as appropriate such that an accurate image of the identification figure is captured. Further, in this example, the image capturing pose is compensated so that all of the difference values fall within their respective allowable ranges; however, the present invention is not limited thereto. The image capturing pose may be compensated so that either the difference values of the coordinate values (x, y, z) or the difference values of the rotational angle values (rx, ry, rz) fall within their respective allowable ranges.

<Compensation of Image Capturing Pose>

The automatic-operation control unit 47 calculates a transformation matrix $M_{robot\_current}^{camera\_teach}$ for transformation from the teaching-operation robot coordinate system to the actual-operation robot coordinate system in accordance with Equation 8 below based on the transformation matrix $M_{fig}^{camera\_teach}$ for transformation from the teaching-operation camera coordinate system to the figure coordinate system.

$$M_{robot\_current}^{camera\_teach} = M_{robot\_current}^{fig} \cdot M_{fig}^{camera\_teach} \quad \text{(Equation 8)}$$

In Equation 8, $M_{robot\_current}^{fig}$ is the transformation matrix for transformation from the figure coordinate system to the actual-operation robot coordinate system that can be calculated in accordance with Equation 4 above.

Figure 12:
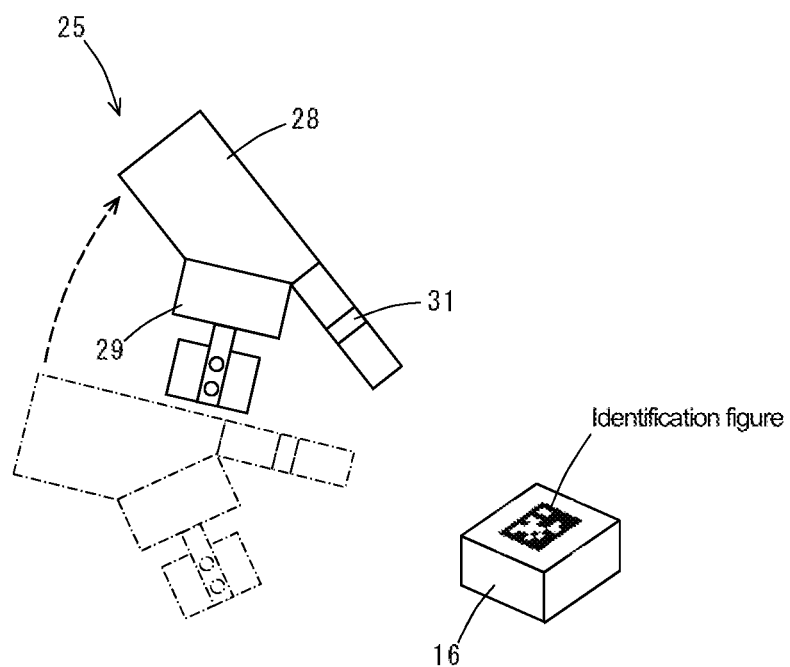
FIG. 12 is a diagram illustrating a manner of compensation for making the image capturing pose of the camera in the actual operation closer to the image capturing pose of the camera in the teaching operation in the case where there is an error between the image capturing pose of the camera in the teaching operation and the image capturing pose of the camera in the actual operation.

Subsequently, the automatic-operation control unit 47 shifts the position of the camera 31 to a camera position ($x_{robot\_current}^{camera\_teach}$, $y_{robot\_current}^{camera\_teach}$, $z_{robot\_current}^{camera\_teach}$) and a camera angle ($rx_{robot\_current}^{camera\_teach}$, $ry_{robot\_current}^{camera\_teach}$, $rz_{robot\_current}^{camera\_teach}$) calculated by means of the transformation matrix $M_{robot\_current}^{camera\_teach}$ for transformation from the teaching-operation camera coordinate system to the actual-operation robot coordinate system, thereby compensating the image capturing pose of the robot 25 (see FIG. 12, where the position (pose) of the camera 31 is compensated from the position (pose) indicated by dotted-and-dashed lines to the position (pose) indicated by solid lines). Note that this compensated camera position is identical to the camera position in the teaching operation in the actual-operation robot coordinate system. In ordinary cases, this compensation shifts the position (pose) of the camera 31 in the actual operation to the position identical to the position (pose) of the camera 31 in the teaching operation. However, since the pose of the robot 25 is changed by this compensation, depending on the behavior of the automatic guided vehicle 35, the difference between the compensated camera position and the camera position in the teaching operation may not fall within the allowable range. In such a case, the above-described compensation process is repeatedly carried out until the error of the image capturing pose in the actual operation with respect to the image capturing pose in the teaching operation falls within the allowable range.

Figure 13:
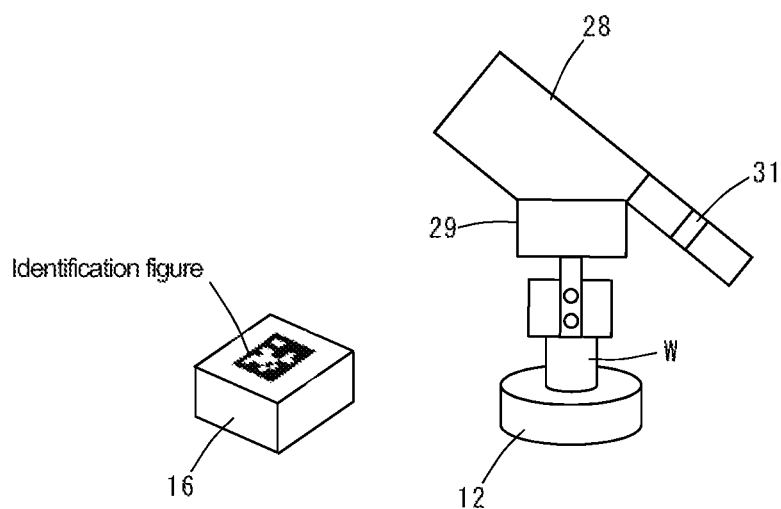
FIG. 13 is a diagram illustrating a state where the operating pose of the hand is compensated based on an image of the identification figure captured with the image capturing pose of the camera in the actual operation compensated.

Thus, in the case where the camera position in actual operation differs from the camera position in the teaching operation, the automatic-operation control unit 47 compensates the image capturing pose of the robot 25 so that the camera position in the actual operation almost coincides with the camera position in the teaching operation, and then causes the camera 31 to capture an image of the identification figure. Thereafter, the automatic-operation control unit 47 compensates the target operating position for the hand 29 in each subsequent operating pose by means of Equation 3 above based on the captured image, and controls the robot 25 so that the hand 29 moves to the compensated target operating position ($x_{robot\_current}^{goal}$, $y_{robot\_current}^{goal}$, $z_{robot\_current}^{goal}$) and target operating angle ($rx_{robot\_current}^{goal}$, $ry_{robot\_current}^{goal}$, $rz_{robot\_current}^{goal}$). Thereby, the hand 29 is, for example as shown in FIG. 13, moved to the target operating position set in the teaching operation. Note that FIG. 13 shows a state where the hand 29 of the robot 25 is positioned at the target operating position with no positional error, so that the hand 29 is positioned at a position in front of the chuck 12 such that the axis of the workpiece W is coaxial with the axis of the chuck 12.

[General Description about Control of Operation of Robot-Mounted Transportation Device with Respect to Machine Tool]

Figure 14:
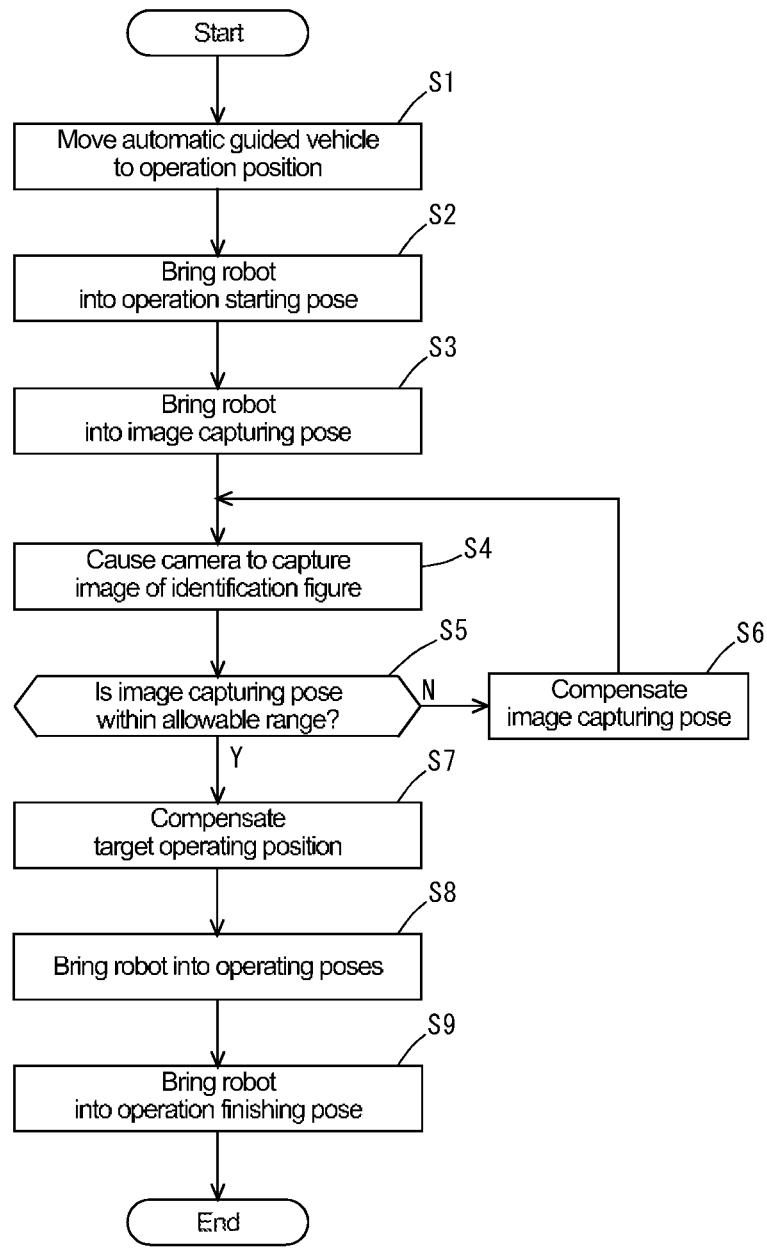
FIG. 14 is a flowchart illustrating how the automatic guided vehicle and the robot are operated under automatic operation control in this embodiment.

Next, control of operation of the robot-mounted transportation device with respect to the machine tool 10 is generally described on the basis of FIG. 14 in light of the foregoing description.

When causing the robot-mounted transportation device to carry out an operation with respect to the machine tool 10, the automatic-operation control unit 47 controls operation of the robot-mounted transportation device in the following manner.

That is to say, the automatic-operation control unit 47 first moves the automatic guided vehicle 35 to the operation position set with respect to the machine tool, and then stops the automatic guided vehicle 35 at the operation position (step S1). Subsequently, the automatic-operation control unit 47 brings the robot 25 into the operation starting pose (step S2), and then brings the robot 25 into the image capturing pose (step S3). In this state, the automatic-operation control unit 47 causes the camera 31 to capture an image of the identification figure (step S4). Thereafter, the automatic-operation control unit 47 obtains a pair of figure position and figure angle ($x_{camera\_current}^{fig}$, $y_{camera\_current}^{fig}$, $z_{camera\_current}^{fig}$, $rx_{camera\_current}^{fig}$, $ry_{camera\_current}^{fig}$, $rz_{camera\_current}^{fig}$) in the camera current coordinate system and a pair of figure position and figure angle ($x_{camera\_teach}^{fig}$, $y_{camera\_teach}^{fig}$, $z_{camera\_teach}^{fig}$, $rx_{camera\_teach}^{fig}$, $ry_{camera\_teach}^{fig}$, $rz_{camera\_teach}^{fig}$) in the teaching-operation camera coordinate system based on the captured current image of the identification figure and the image of the identification figure captured in the teaching operation, and then calculates difference values ($\Delta x$, $\Delta y$, $\Delta z$, $\Delta rx$, $\Delta ry$, $\Delta rz$) between the pairs of figure position and figure angle and determines (judges) whether the difference values fall within their respective allowable ranges as described above (step S5).

In the case where it is determined in step S5 that the difference values do not fall within their respective allowable ranges, the automatic-operation control unit 47 repeatedly carries out steps S4 and S5 while compensating the image capturing pose (step S6) until the difference values fall within their respective allowable ranges.

In the case where all of the difference values fall within their respective allowable ranges, the automatic-operation control unit 47 calculates, in accordance with Equation 3 above, pairs of target operating position and target operating angle ($x_{robot\_current}^{goal}$, $y_{robot\_current}^{goal}$, $z_{robot\_current}^{goal}$, $rx_{robot\_current}^{goal}$, $ry_{robot\_current}^{goal}$, $rz_{robot\_current}^{goal}$) that correspond to compensated operating poses for the operating poses set in the teaching operation (step S7), and brings the robot 25 in sequence into the operating poses corresponding to the calculated pairs of target operating position and target operating angle ($x_{robot\_current}^{goal}$, $y_{robot\_current}^{goal}$, $z_{robot\_current}^{goal}$, $rx_{robot\_current}^{goal}$, $ry_{robot\_current}^{goal}$, $rz_{robot\_current}^{goal}$) (step S8). Thereafter, the automatic-operation control unit 47 brings the robot 25 into the operation finishing pose (step S9) to end the operation.

As described in detail above, the system 1 according to this embodiment is configured such that, in compensating the operating poses of the robot 25, the image capturing pose of the camera 31 in the actual operation is compensated based on an image of the identification figure captured by the camera 31 so that the error of the image capturing pose of the camera 31 in the actual operation with respect to the image capturing pose of the camera 31 in the teaching operation falls within an allowable range; therefore, a clear and accurate image of the identification figure is captured by the camera 31 in actual operation. Consequently, compensation of the operating poses of the robot 25 that is carried out based on the image is carried out more accurately.

Further, the system 1 according to this embodiment is configured such that the identification figure arranged in the machining area of the machining tool 10 where the robot 25 actually performs the operations is used to compensate the operating poses of the robot 25; therefore, the operating poses of the robot 25 are accurately compensated. This enables the robot 25 to accurately carry out even an operation which requires high operating accuracy.

Since the robot 25 accurately carries out operations, the system 1 operates with high availability without unnecessary interruption. Consequently, the system 1 enables an unmanned system with high reliability and high production efficiency.

Further, the identification figure in this embodiment is provided on the support bar 15 of the tool presetter 13 that is stored outside the machining area while machining is performed by the machine tool 10; therefore, the identification figure is prevented from being soiled by chips or the like produced during machining. Consequently, the compensation is carried out accurately.

Further, the identification figure in this embodiment has a matrix structure having a plurality of pixels arranged two-dimensionally; therefore, the operating poses are compensated with high accuracy.

Hereinbefore, one embodiment of the present invention has been described. However, it should be understood that the present invention is not limited to the above-described embodiment and can be implemented in different manners.

For example, in the above-described embodiment, the identification figure has a matrix structure having a plurality of pixels arranged two-dimensionally. However, the identification figure is not limited to such a figure and may be any other suitable figure which allows for compensation of the pose of the robot 25 based on a captured image of the figure.

Further, in the above-described embodiment, the operating poses of the robot 25 in actual operation are compensated based on a captured image of the identification figure without calculating an amount of error of the operating poses of the robot 25 in the actual operation with respect to the pose of the robot 25 in the teaching operation. However, the present invention is not limited to such a configuration and the operating poses of the robot 25 in actual operation may be compensated by any other suitable method. For example, a configuration is possible in which an amount of error of the image capturing pose of the robot 25 for capturing of an image of the identification figure in actual operation with respect to the image capturing pose of the robot 25 in the teaching operation is calculated and the other operating poses of the robot 25 are compensated based on the calculated amount of error.

Further, in the above-described embodiment, the operating poses of the robot 25 are compensated by compensating an error thereof in a three-dimensional space. However, the present invention is not limited to such a configuration and the operating poses of the robot 25 may be compensated by compensating an error thereof in a plane defined by two particular orthogonal axes. For example, a configuration is possible in which the identification figure is arranged horizontally and positional errors in a first axis and a second axis in a plane including the identification figure and a rotational error around an axis perpendicular to the plane are compensated.

Further, in the above-described embodiment, an example configuration is described in which the automatic guided vehicle 35 is used. However, the present invention is not limited to such a configuration and the automatic guided vehicle 35 may be replaced with a transportation device which is able to be moved by a human operator pushing it, such as a generally used carriage. In such a case, a configuration is possible in which the robot 25 is mounted on the transportation device and the transportation device is moved to the operation position set with respect to the machine tool 10 by human power to cause the robot 25 to carry out attachment or removal of a workpiece to or from the machine tool 10.

Further, in the above-described embodiment, the display board 16, i.e., the identification figure, is arranged horizontally in the machine tool 10. However, the present invention is not limited to such a configuration and the identification figure may be arranged in parallel with a vertical plane.

Further, in the above-described embodiment, a vertical lathe as an example machine tool is described. However, the present invention is not limited to application to a vertical lathe and is applicable also to other known types of machine tools, such as a horizontal lathe, a vertical machining center, a horizontal machining center, and a combined machine tool having a tool spindle and a workpiece spindle.

Figure 15:
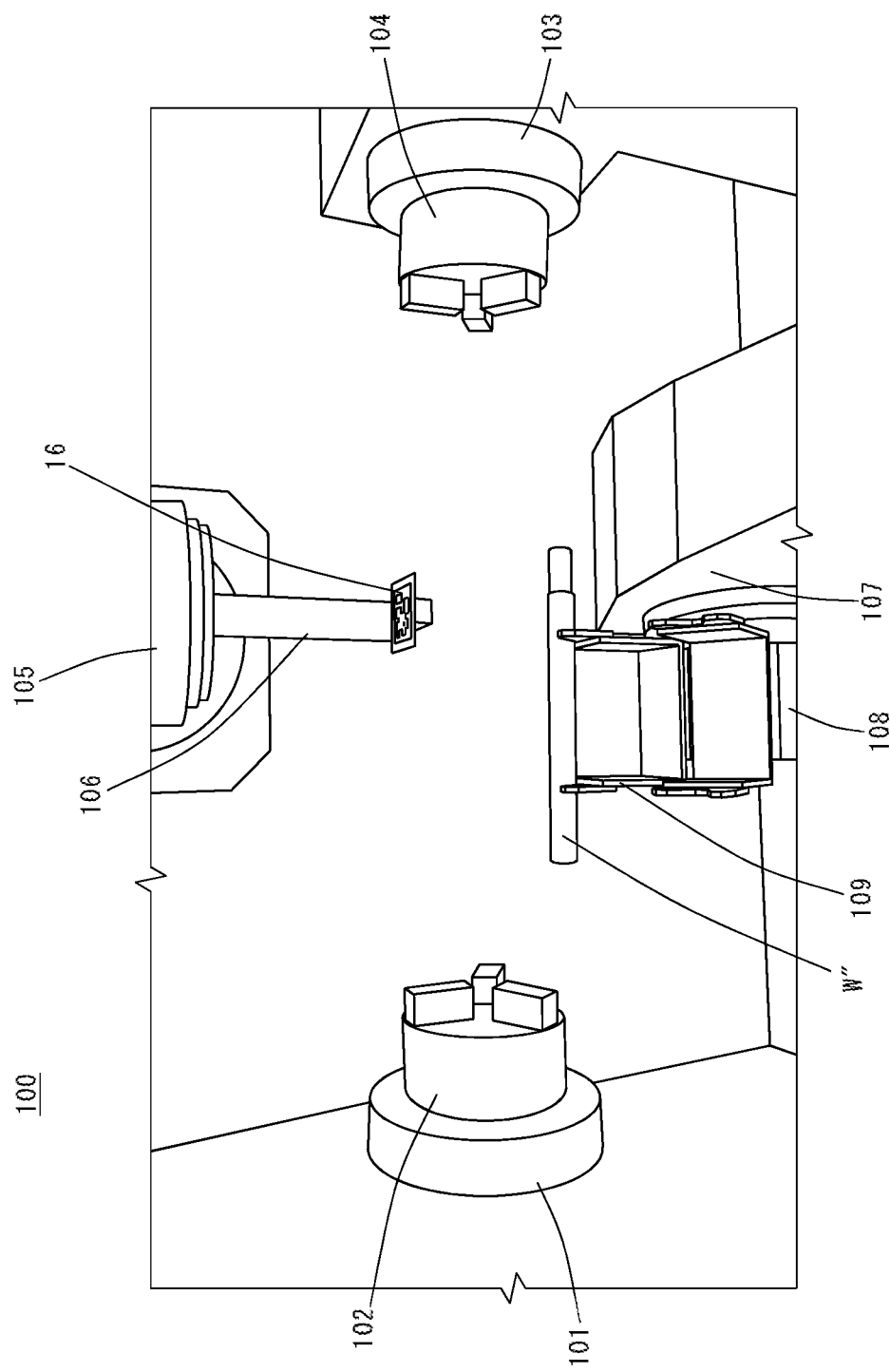
FIG. 15 is a diagram illustrating a variation of the configuration with the identification figure arranged in the machine tool.

For example, in the case of a horizontal lathe 100 as illustrated in FIG. 15 that has a tool spindle 105 rotating a tool, the lathe 100 can be configured such that, as illustrated in FIG. 15, the display board 16 is supported horizontally by a holder 106 and the holder 106 is to be attached to the tool spindle 105. Alternatively, a configuration is possible in which, as illustrated in FIG. 16, a display board 112 is supported vertically by a holder 111. In each case, the holder 106, 111 is stored in a tool magazine as a tool storage while machining is performed by the lathe 100, 110, and the holder 106, 111 is extracted from the tool magazine and attached to the tool spindle 105 when the robot 25 performs an operation. Note that, in FIGS. 15 and 16, reference numeral 101 denotes a first spindle, reference numeral 103 denotes a second spindle, and these spindles are arranged to be coaxial with each other and face each other. Further, reference numeral 102 denotes a first chuck attached to the first spindle 101 and reference numeral 104 denotes a second chuck attached to the second spindle 103. Further, reference numeral 107 denotes a tool rest, reference numeral 108 denotes a turret mounted on the tool rest 107, and reference numeral 109 denotes a support jig attached to an outer surface of the turret 108 to support a workpiece W".

Further, in the above-described embodiment, the robot coordinate system, the camera coordinate system, the figure coordinate system, and the goal coordinate system each have the x-axis and the y-axis set in a horizontal plane and the z-axis set vertically. However, the present invention is not limited to such a configuration. The directions of the coordinate axes can be set freely.

Further, the above-described embodiment is described mainly with respect to an example in which the robot 25 attaches and removes a workpiece W (W'). However, the present disclosure is not limited thereto. The target object to be handled by the robot 25 may be any other suitable object which is able to be attached to and removed from the machine tool 10, examples of which include, besides the above-mentioned workpiece W (W'), a tool, an ATC camera, and a measurement device.

Below is a possible variation of the present invention.
(Variation)
The above-described embodiment is described with respect to an example in which an image including the identification figure is captured by the camera and the position of the camera is calculated based on the position of the identification figure in the image to control movement of the camera to a preset camera position. However, the present invention is not limited to this example.

This variation is configured not to use the identification figure. In this variation, a profile of an internal shape of the machine tool in a two-dimensional image is detected from a captured image and the detected profile is compared with preset CAD data on shape. The ratio of matching points between profile data extracted from the image and two-dimensional shape data generated based on the CAD data is evaluated to identify a shape having a profile having many matching points (a high degree of matching) with the preset shape, and the position of the camera is calculated based on the position of the identified shape. Because of not using the identification figure, this variation is able to use the shape of an internal structure of the machine tool as reference. Examples of the internal structure include a chuck, a tool, a spindle, a turret, a tool presetter, a table, and a pallet. The internal structure may be, of course, the identification figure.

In three-dimensional recognition based on internal structure profile (shape), judgment may be made by evaluating the number of matching points between an edge extracted from an image and a profile obtained by projecting a three-dimensional model created based on three-dimensional CAD data or the like into a two-dimensional image. In three-dimensional recognition based on three-dimensional point cloud, judgment may be made on the basis of evaluation based on the number of matching points between a three-dimensional point cloud measured by a predetermined method and a three-dimensional model.

This variation can provide the following image processing, namely, an image processing method of processing an image captured by a camera of a robot-mounted transportation device, the robot-mounted transportation device including: (i) the camera capturing the image; (ii) a robot having the camera attached thereto and having an acting part acting on a target object; (iii) a moving device having the robot mounted thereon and configured to be movable; and (iv) a controller controlling a position of the acting part, the image processing method including:

a first calculation step of analyzing a first image of an internal structure of a machine tool captured by the camera and calculating a current position of the camera based on analysis of the internal structure in the first image;

a first control step of controlling motion of the robot to move the camera from the current position of the camera to a preset position of the camera;

a second calculation step of, after moving the camera, causing the camera to capture an image of the internal structure of the machine tool, analyzing the internal structure in the captured second image, and calculating a current position of the acting part; and a second control step of controlling motion of the robot to move the acting part from the current position of the acting part to a preset position of the target object or a preset position to which the target object is to be transported.

This variation can also provide the following image processing apparatus, namely, an image processing apparatus processing an image captured by a camera of a robot-mounted transportation device, the robot-mounted transportation device including: (i) the camera capturing the image; (ii) a robot having the camera attached thereto and having an acting part acting on a target object; (iii) a moving device having the robot mounted thereon and configured to be movable; and (iv) a controller controlling a position of the acting part, the image processing apparatus including:

a first calculator configured to analyze a first image of an internal structure of a machine tool captured by the camera and calculate a current position of the camera based on analysis of the internal structure in the first image;

a first control unit configured to control motion of the robot to move the camera from the current position of the camera to a preset position of the camera;

a second calculator configured to, after moving the camera, cause the camera to capture an image of the internal structure of the machine tool, analyze the internal structure in the captured second image, and calculate a current position of the acting part; and a second control unit configured to control motion of the robot to move the acting part from the current position of the acting part to a preset position of the target object or a preset position to which the target object is to be transported.

In this image processing, an internal structure of the machine tool is used instead of the identification figure to identify the position of the camera. Note that the other configurations and control processes that are usable in the image processing using a captured image of the identification figure are, of course, applicable to this variation.

As already mentioned above, the above description of the embodiments is not limiting but illustrative in all aspects. One skilled in the art would be able to make variations and modifications as appropriate. The scope of the present invention is not defined by the above-described embodiments, but is defined by the appended claims. Further, the scope of the present invention encompasses all modifications made within the scope equivalent to the scope of the claims.

REFERENCE SIGNS LIST

1 System
10 Machine tool
11 Spindle
12 Chuck
13 Tool presetter
14 Contactor
15 Support bar
16 Display board
20 Material storage
21 Product storage
25 Robot
29 Hand
31 Camera
35 Automatic guided vehicle
37 Operation panel
40 Controller
41 Operation program storage
42 Moving position storage
43 Operating pose storage
44 Map information storage
45 Identification figure image storage
46 Manual-operation control unit
47 Automatic-operation control unit
48 Map information generator
49 Position recognition unit
50 Input and output interface
W Unmachined workpiece
W' Machined workpiece

What is claimed is:

1. An image processing method of processing an image captured by a camera of a robot-mounted transportation device, the transportation device including: (i) the camera capturing the image; (ii) a robot having the camera attached thereto and having an acting part acting on a target object; (iii) a moving device having the robot mounted thereon and configured to be movable; and (iv) a controller controlling a position of the acting part, the image processing method comprising:

an opening step of opening a door cover of a machine tool to expose an internal structure of the machine tool;

a positioning step of moving the moving device to an operation position set with respect to the machine tool, and then stopping the moving device at the operation position;

a first calculation step of causing the camera to capture a first image of an internal structure in a machining area of the machine tool with the machine tool open, and, with the moving device stopped at the operation position of the moving device when capturing the first image, analyzing the captured first image and calculating a current position of the camera based on analysis of the internal structure in the first image;

a first control step of controlling motion of the robot to move the camera from the current position of the camera to a preset position of the camera with the machine tool open, with the moving device stopped at the operating position of the moving device;

a second calculation step of, after moving the camera at the same position of the moving device, causing the camera to capture a second image of the internal structure with the machine tool open, analyzing the internal structure in the captured second image, and calculating a current position of the acting part; and a second control step of controlling motion of the robot to move the acting part from the current position of the acting part to a preset position of the target object or a preset position to which the target object is to be transported with the machine tool open.

2. The image processing method according to claim 1, wherein the internal structure is an identification figure, a chuck, a tool, a spindle, a turret, a tool presetter, a table, or a pallet.

3. An image processing apparatus processing an image captured by a camera of a robot-mounted transportation device, the transportation device including: (i) the camera capturing the image; (ii) a robot having the camera attached thereto and having an acting part acting on a target object; (iii) a moving device having the robot mounted thereon and configured to be movable; and (iv) a controller controlling a position of the acting part, the image processing apparatus comprising:

a door cover that, when opened, exposes an internal structure of a machine tool, wherein the moving device is moved to an operation position set with respect to the machine tool, and then the moving device is stopped at the operation position;

a first calculator configured to cause the camera to capture a first image of an internal structure in a machining area of the machine tool with the machine tool open, and, with the moving device stopped at the operation position of the moving device when capturing the first image, analyze the captured first image and calculate a current position of the camera based on analysis of the internal structure in the first image;

a first control unit configured to control motion of the robot to move the camera from the current position of the camera to a preset position of the camera with the machine tool open, with the moving device stopped at the operation position of the moving device;

a second calculator configured to, after moving the camera at the same position of the moving device, cause the camera to capture a second image of the internal structure with the machine tool open, analyze the internal structure in the captured second image, and calculate a current position of the acting part; and a second control unit configured to control motion of the robot to move the acting part from the current position of the acting part to a preset position of the target object or a preset position to which the target object is to be transported with the machine tool open.

4. An image processing method of processing an image captured by a camera of a robot-mounted transportation device, the transportation device including: (i) the camera capturing the image; (ii) a robot having the camera attached thereto and having an acting part acting on a target object; (iii) a moving device having the robot mounted thereon and configured to be movable; and (iv) a controller controlling a position of the acting part, the image processing method comprising:

an opening step of opening a door cover of a machine tool to expose an internal structure of the machine tool;

a positioning step of moving the moving device to an operation position set with respect to the machine tool, and then stopping the moving device at the operation position;

a first calculation step of causing the camera to capture a first image of an AprilTag provided on the machine tool and having a matrix structure having a plurality of square pixels arranged two-dimensionally with the machine tool open, and, with the moving device stopped at the operation position of the moving device when capturing the first image, analyzing the captured first image and calculating a current position of the camera based on analysis of the AprilTag in the first image;

a first control step of controlling motion of the robot to move the camera from the current position of the camera to a preset position of the camera with the machine tool open, with the moving device stopped at the operation position of the moving device;

a second calculation step of, after moving the camera at the same position of the moving device, causing the camera to capture a second image of the AprilTag with the machine tool open, analyzing the AprilTag in the captured second image, and calculating a current position of the acting part; and a second control step of controlling motion of the robot to move the acting part from the current position of the acting part to a preset position of the target object or a preset position to which the target object is to be transported with the machine tool open.

5. An image processing apparatus processing an image captured by a camera of a robot-mounted transportation device, the transportation device including: (i) the camera capturing the image; (ii) a robot having the camera attached thereto and having an acting part acting on a target object; (iii) a moving device having the robot mounted thereon and configured to be movable; and (iv) a controller controlling a position of the acting part, the image processing apparatus comprising:

a door cover that, when opened, exposes an internal structure of a machine tool, wherein the moving device is moved to an operation position set with respect to the machine tool, and then the moving device is stopped at the operation position;

a first calculator configured to cause the camera to capture a first image of an AprilTag provided on the machine tool and having a matrix structure having a plurality of square pixels arranged two-dimensionally with the machine tool open, and, with the moving device stopped at the operation position of the moving device when capturing the first image, analyze the captured first image and calculate a current position of the camera based on analysis of the AprilTag in the first image;

a first control unit configured to control motion of the robot to move the camera from the current position of the camera to a preset position of the camera with the machine tool open, with the moving device stopped at the operation position of the moving device;

a second calculator configured to, after moving the camera at the same position of the moving device, cause the camera to capture a second image of the AprilTag, analyze the AprilTag in the captured second image with the machine tool open, and calculate a current position of the acting part; and a second control unit configured to control motion of the robot to move the acting part from the current position of the acting part to a preset position of the target object or a preset position to which the target object is to be transported with the machine tool open.

* * * * *